United States Patent Office 3,312,652
Patented Apr. 4, 1967

3,312,652
POLYVINYL ACETATE OR POLYACRYLATE CONTAINING 3-HYDROXY - 2,2,4 - TRIMETHYLPENTYL ISOBUTYRATE AS COALESCING AGENT
Charles H. Coney and Willie E. Draper, Kingsport, Tenn., assignors to Eastman Kodak Company, Rochester, N.Y., a corporation of New Jersey
No Drawing. Filed July 26, 1963, Ser. No. 297,969
6 Claims. (Cl. 260—29.6)

This invention relates to film forming compositions. More particularly, it relates to film forming latex compositions, such as paints and adhesives, dispersed in water.

Water dispersed latex paints are well known and have become quite popular. At the present time, there are three major commercial latexes—acrylic, butadiene- styrene and polyvinyl acetate. Substantially all the latex paints manufactured today utilize a water dispersion of one of the resinous materials just mentioned as the pigment binder.

Many latex paint and adhesive formulations require a small amount of an active solvent to improve their properties. Among the improvements desired for latex paints are better coalescence at low temperatures, greater pigment binding power, improved flow-out and reduced pigment flocculation. Reduced adhesive tack time, giving an adhesive formulation more rapid "grab" when applied between two surfaces to be adhered, is desired for latex adhesive formulations. Ethylene glycol monobutyl ether acetate (butyl Cellosolve acetate) and diethylene glycol monoethyl ether (Carbitol) are in current use to improve the properties of latex paints formulated with polyvinyl acetate or acrylic resins.

If the coalescence of a paint at low temperature is improved it can be applied at lower temperatures than ordinarily, at a temperature close to the freezing point of water, for example. This is of importance because the painting season is extended.

Plasticizers, such as dibutyl phthalate, for example, are used to flexibilize films formed from latexes and function also to increase film coalescence resulting in lower minimum film forming temperature. However, permanent softening of the film limits the amount of plasticizer which can be used. Ordinarily, the amount of plasticizer required to produce the desired degree of film coalescence would result in films too soft for practical applications. The present invention provides a means of obtaining satisfactory film coalescence in certain aqueous latex film forming compositions.

Inasmuch as paints are sometimes subjected to wide variations in temperature, including freezing temperatures, it is desirable that a paint have freeze-thaw stability.

It is desirable that paints have little or no pigment flocculation because paints having little or no pigment flocculation, when applied by a brush, for example, to a surface to be painted, normally yield better appearing films than paints in which pigment flocculation occurs.

The properties desired in aqueous films forming latex compositions, such as pigment paints and adhesives, are well known to those skilled in the art and further discussion with respect thereto is believed unnecessary. Latex paints are discussed on pages 67 and 68 of Chemical Week for June 22, 1963, and reference should be had thereto for additional information on latex paints, such as those mentioned hereinbefore.

It is an object of our invention to provide aqueous latex emulsions having improved film forming properties at low temperatures, improved pigment binding power, reduced pigment flocculation, improved flow-out and which produce coatings having improved resistance to water.

A further object is to accomplish the foregoing objects without causing appreciable changes in emulsion viscosity and without affecting the stability of the emulsion or of products compounded therefrom.

We have discovered that if 3-hydroxy-2,2,4-trimethylpentyl isobutyrate is added to a water dispersion or emulsion of a compatible latex the properties of the latex dispersion or emulsion are improved. The invention is particularly applicable to aqueous polyvinyl acetate dispersions or emulsions. Improved properties are also obtained when 3-hydroxy-2,2,4-trimethylpentyl isobutyrate is added to an acrylic-water dispersion or emulsion. The invention has little or no applicability to a water dispersion or emulsion of butadiene-styrene because coagulation (gelation) takes place.

Unless otherwise indicated, the latex compositions (e.g. dispersion or emulsion, paint, adhesive) referred to herein contain water.

The preparation of 3-hydroxy-2,2,4-trimethylpentyl isobutyrate employed in the practice of our invention is described, for example, in Hagemeyer and Wright U.S. Patent 3,091,632 issued May 28, 1963. 3-hydroxy-2,2,4-trimethylpentyl isobutyrate has the formula:

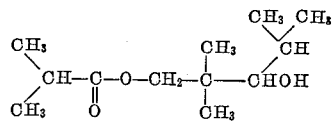

The 3-hydroxy-2,2,4-trimethylpentyl isobutyrate should be present in the aqueous latex composition in sufficient amount to materially improve the properties of the aqueous latex composition. In the case of aqueous latex paints about 1% to about 5% by weight of 3-hydroxy-2,2,4-trimethylpentyl isobutyrate based on the total weight of the aqueous latex paint composition can be used. In the case of aqueous latex adhesive compounds about 1% to about 10% by weight of 3-hydroxy-2,2,4-trimethylpentyl isobutyrate can be used. For both paint and adhesive compositions the use of from about 2% to about 4% by weight of 3-hydroxy-2,2,4-trimethylpentyl isobutyrate is preferred.

3-hydroxy-2,2,4-trimethylpentyl isobutyrate is available commercially under the trade name Texanol. Texanol is a trademark of Eastman Kodak Company.

3-hydroxy-2,2,4-trimethylpentyl isobutyrate, ethylene glycol monobutyl ether acetate and diethylene glycol monoethyl ether were separately incorporated in typical commercial polyvinyl acetate and acrylic emulsions and in paints made from these emulsions and the resulting emulsions and paints were evaluated. The details of the tests are set forth hereinafter.

Emulsions

2% by weight (based on the total weight of the emulsion) of each of the solvents, 3-hydroxy-2,2,4-trimethylpentyl isobutyrate, ethylene glycol monobutyl ether acetate and diethylene glycol monoethyl ether, was added to each of the polyvinyl acetate and acrylic emulsions (i.e., each emulsion contained only one of the solvents). Each solvent was added slowly to the emulsion with agitation and uniformly dispersed throughout the emulsion. The freeze-thaw stability, minimum film-forming temperature, solution viscosity stability and adhesive tack time of the resulting emulsions were then determined.

The polyvinyl acetate emulsion employed was Elvacet 81–900 manufactured and sold by E. I. du Pont de Nemours & Co. Elvacet 81–900 is an aqueous emulsion of polymerized vinyl acetate. The acrylic emulsion employed was Rhoplex AC–33 manufactured and sold by Rohm & Haas Co. Rhoplex AC–33 is an aqueous emulsion of the polymer obtained by the polymerization of about 39% by weight of methyl methacrylate with about 61% by weight of ethyl acrylate.

Freeze-thaw stability

Samples of each of the emulsions prepared as described hereinbefore and containing 2% of solvent by weight (based on the total weight of the emulsion) were subjected to a temperature of −28° C. for 16 hours and then thawed at room temperature. This freezing-thawing cycle was continued for ten cycles or until the emulsion showed signs of failure. After 10 cycles there was no sign of failure in any of the polyvinyl acetate emulsion samples. The acrylic emulsion containing diethylene glycol monoethyl ether showed no sign of failure after 10 cycles. The acrylic emulsion containing ethylene glycol monobutyl ether acetate failed during the first cycle while that containing 3-hydroxy-2,2,4-trimethylpentyl isobutyrate showed signs of failure after 3 cycles. The test data is set forth in Table 1.

The number appearing in the column entitled "Stability" is the number of freeze-thaw cycles the emulsion underwent without failure. As noted previously, the maximum number of freeze-thaw cycles to which the emulsions were subjected is 10. A freeze-thaw stability of 10 cycles is excellent. One indication of the shelf-life of an emulsion is its ability to remain emulsified with no phase separation after freezing and subsequently thawing.

TABLE 1.—FREEZE-THAW STABILITY

| Emulsion | Solvent | Stability |
|---|---|---|
| Polyvinyl acetate | 3-hydroxy-2,2,4-trimethylpentyl isobutyrate. | 10 |
| Do | Ethylene glycol monobutyl ether acetate. | 10 |
| Do | Diethylene glycol monoethyl ether | 10 |
| Acrylic | 3-hydroxy-2,2,4-trimethylpentyl isobutyrate. | 2 |
| Do | Ethylene glycol monobutyl ether acetate. | 0 |
| Do | Diethylene glycol monoethyl ether | 10 |

Minimum film-forming temperature

In this test the solvent containing emulsions, as well as the same emulsions without a solvent, were cast on a crome-plated temperature gradient platform of the customary apparatus used to determine the minimum film forming temperature of a film forming composition or material. The temperature of the gradient platform ranged from 30° F. to 90° F.

The results obtained are set forth hereinafter in Table 2.

TABLE 2.—MINIMUM FILM FORMING TEMPERATURE

| Emulsion | Solvent | MFFT (° F.)[1] |
|---|---|---|
| Polyvinyl acetate | None | 59 |
| Do | 3-hydroxy-2,2,4-trimethylpentyl isobutyrate. | 44 |
| Do | Ethylene glycol monobutyl ether acetate. | 44 |
| Do | Diethylene glycol monoethyl ether | 56 |
| Acrylic | None | 48 |
| Do | 3-hydroxy-2,2,4-trimethylpentyl isobutyrate. | 40 |
| Do | Ethylene glycol monobutyl ether acetate. | 40 |
| Do | Diethylene glycol monoethyl ether | 46 |

[1] MFFT stands for minimum film forming temperature.

Solution viscosity stability

Pint size samples of the solvent containing emulsions were prepared and their viscosities were taken weekly on a Brabender Viscosimeter.

The results obtained are set forth hereinafter in Table 3.

TABLE 3.—SOLUTION VISCOSITY STABILITY OF EMULSIONS
[Brabender Viscosimeter; 105 r.p.m.; Flag Type Paddle; Light Spring Assembly]

| Latex | Solvent | Initial | | 7 Days | | 14 Days | | 21 Days | | 28 Days | |
|---|---|---|---|---|---|---|---|---|---|---|---|
| | | Initial[1] | Basic[2] | Initial | Basic | Initial | Basic | Initial | Basic | Initial | Basic |
| Polyvinyl acetate | None | 960 | 740 | | | | | | | | |
| | 3-hydroxy-2,2,4-trimethylpentyl isobutyrate. | 470 | 380 | 720 | 420 | 910 | 530 | 1,000 | 680 | 910 | 480 |
| | Ethylene glycol monobutyl ether acetate. | 470 | 390 | 590 | 420 | 720 | 480 | 1,060 | 740 | 660 | 480 |
| | Diethylene glycol monoethyl ether | 370 | 340 | 470 | 370 | 620 | 420 | 860 | 650 | 560 | 430 |
| Acrylic | None | 170 | 200 | | | | | | | | |
| | 3-hydroxy-2,2,4-trimethylpentyl isobutyrate. | 80 | 100 | 80 | 110 | 120 | 180 | 200 | 270 | 150 | 170 |
| | Ethylene glycol monobutyl ether acetate. | 80 | 90 | 100 | 120 | 120 | 160 | 200 | 250 | 140 | 150 |
| | Diethylene glycol monoethyl ether | 60 | 70 | 60 | 70 | 110 | 140 | 160 | 210 | 110 | 130 |

[1] Initial viscosity; difference between this value and basic viscosity value indicates the degree of thixotropy.
[2] Viscosity after equilibrium was attained.

The results obtained show that the solvents had little effect on the viscosity of the polyvinyl acetate emulsion or the acrylic emulsion. However, 3-hydroxy-2,2,4-trimethylpentyl isobutyrate contributed more to the thixotropy of the emulsions than either ethylene glycol monobutyl ether acetate or diethylene glycol monoethyl ether.

Adhesive tack time

The solvent containing polyvinyl acetate emulsions were coated on a strip of heavy paperboard. A similar strip of uncoated paperboard was immediately applied, with pressure, to the coated paperboard. The drying time required to produce paper-tearing bonds is known as the tack time. The tack times noted are set forth in Table 4. As shown by the table 3-hydroxy-2,2,4-trimethylpentyl isobutyrate produced the lowest tack time.

TABLE 4.—ADHESIVE TACK TEST

| Emulsion | Solvent | Tack Time, Seconds |
|---|---|---|
| Polyvinyl acetate | None | 5.5 |
| Do | 3-hydroxy-2,2,4-trimethylpentyl isobutyrate. | 3 |
| Do | Ethylene glycol monobutyl ether acetate. | 7 |
| Do | Diethylene glycol monoethyl ether | 7 |

Paints 3-hydroxy-2,2,4-trimethylpentyl isobutyrate, ethylene glycol monobutyl ether acetate and diethylene glycol monoethyl ether were compared for their effect on processing properties, pigment and viscosity stability, and flow-out characteristics of the paints. To insure uniformity, the latex paints were prepared using commercial polyvinyl actate and acrylic paint formulations. The results obtained are set forth hereinafter and show that 3-hydroxy-2,2,4-trimethylpentyl isobutyrate is useful in the preparation of aqueous latex paints. The paint compositions disclosed herein are illustrative and not limitative of the invention.

TABLE 5.—EXTERIOR MASONRY PAINT BASE

| Ingredients: | Weight percent |
|---|---|
| Pigment paste: | |
| Water (deionized) | 1.92 |
| Polyglycol P-1200 | .19 |
| Tamol 731 (25% aqueous) | .48 |
| Emulphor EL-719 | .29 |
| Coalescing agent [1] | 3.36 |
| Plasticizer | 2.88 |
| Mica (325 mesh) | 2.88 |
| Rutile TiO$_2$ | 19.19 |
| Water (deionized) | 4.32 |
| Reduction: | |
| Methocel 4000 (2% aqueous) | 19.19 |
| Water (deionized) | 3.55 |
| Elvacet 81-900 (55%) | 34.55 |
| Dowicide A | 1.44 |
| Water (deionized) | 5.76 |
| Total | 100.00 |

[1] The coalescing agents employed were 3-hydroxy-2,2,4-trimethylphenyl isobutyrate, ethylene glycol monobutyl ether acetate and diethylene glycol monoethyl ether, respectively.

The plasticizer referred to in Table 5 can be dibutyl phthalate, diisobutyl phthalate or Plasticizer 135, for example. Plasticizer 135 is made and sold by Eastman Kodak Company.

The ingredients under the heading "Pigment paste" were added in the order given and intimately admixed. Similarly, the ingredients under the heading "Reduction" were added in the order given and intimately admixed. Then the well dispersed "Reduction" portion was added to the well dispersed "Pigment paste" portion and the resulting mixture was stirred until a homogeneous mixture was obtained. The procedure described with reference to Table 5 was followed in preparing the paints of Table 6 except for the variation indicated in connection with Table 6.

Each of the three paint base formulations prepared as just described was divided into two equal portions. To one portion was added 0.56 weight percent of Multisperse Blue R 11-951 and to the other portion was added 3.1 weight percent of Multisperse Yellow 10G 12-953. The pigments added are products of the Sherwin-Williams Co. and are commercial dispersions of phthalocyanine blue and Hansa 10G yellow, respectively. Green paints were prepared by blending equal parts by volume of the corresponding blue and yellow paints immediately after their formation. Nine paints (3 blue, 3 yellow and 3 green) were prepared as just described.

TABLE 6.—EXTERIOR ACRYLIC PAINT

| Ingredients: | Weight percent |
|---|---|
| Pigment paste: | |
| Triton CF-10 (wetting agent) | 0.3 |
| Tamol 731 (25% aqueous) (dispersant) | 0.8 |
| Octyl alcohol (antifoamer) | 0.2 |
| Hydroxyethyl cellulose (2% aq.-4000 cps.) | 5.7 |
| Water (deionized) | 5.7 |
| Rutile TiO$_2$ | 15.1 |
| Mica (water ground, 325 mesh) | 2.7 |
| Calcium carbonate | 16.4 |
| Ethylene glycol | 1.7 |
| Reduction: | |
| Rhoplex AC-33 (46%) | 49.6 |
| Pentachlorophenol* (preservative) | 0.8 |
| Octyl alcohol* (antifoamer) | 0.2 |
| Water* (deionized) | 0.7 |
| Ammonium hydroxide* (28%) | 0.1 |
| Total | 100.0 |

The items marked (*) were premixed together before being added to the formulation.

The acrylic paint formulation set forth in Table 6 was divided into a number of portions. 3-hydroxy-2,2,4-trimethylpentyl isobutyrate was added to one of the portions, ethylene glycol monobutyl ether acetate was added to another portion and diethylene glycol monoethyl ether was added to a third portion. Four percent of these materials (based on the total weight of the resulting paint) were added for evaluation of their utility in acrylic paints.

*Processing properties*

Visual observations made during the preparation of of the polyvinyl acetate and acrylic paints showed no signs of formulation difficulties with the different solvents. However, as previously noted, coagulation occurs when 3-hydroxy-2,2,4-trimethylpentyl isobutyrate is incorporated into a butadiene styrene paint formulation.

*Pigment stability*

Each of the blue, yellow and green polyvinyl acetate paints as well as the polyvinyl acetate control paints (12 paints in all) was smeared in a circular fashion on white paper. When the paint smear began to dry, one-half of it was disturbed by rubbing the surface several times. The purpose of the additional rubbing was to simulate the rebrushing at lapped areas often occurring during application of paint.

After two weeks aging of the polyvinyl acetate paints, smears made from those containing 3-hydroxy-2,2,4-trimethylpentyl isobutyrate and those containing ethylene glycol monobutyl ether acetate showed no visible color difference between the disturbed and undisturbed areas. Those containing diethylene glycol monoethyl ether showed a distinguishable difference in the yellow and green paint films. The control paint containing no coalescing solvent showed considerable difference in the yellow and green paint films.

TABLE 7.—EFFECT OF SOLVENTS ON PIGMENT STABILITY IN POLYVINYL ACETATE PAINTS
[Color Difference Between Wet- and Dry-Brushed Portions Containing]

| | Control | 3-hydroxy-2,2,4-trimethyl-pentyl isobutyrate | Ethylene glycol monobutyl ether acetate | Diethylene glycol monoethyl ether |
|---|---|---|---|---|
| Multisperse Blue R 11-951 | 0.1 | 0.0 | 0.2 | 0.2 |
| Multisperse Yellow 10G 12-953 | 11.7 | 0.1 | 0.2 | 3.1 |
| 1:5.5 Multisperse Blue R 11-951:Multisperse Yellow 10G 12-953 | 11.7 | 0.2 | 0.4 | 2.6 |

As confirmation of this visible color difference, the paint films were checked for their color difference by use of the Gardner "Automatic Color Difference Meter" in accordance with ASTM D1365–60T. The color difference values between the disturbed and undisturbed paint smears are shown in Table 7.

*Solution viscosity stability*

The effects of 3 - hydroxy - 2,2,4 - trimethylpentyl isobutyrate, ethylene glycol monobutyl ether acetate and diethylene glycol monoethyl ether on the viscosity stabilities of the polyvinyl acetate paints were determined using the Brabender Recording Viscosimeter. The viscosities of the prepared paints were determined periodically during storage. The results obtained are shown in Table 8.

3-hydroxy-2,2,4-trimethylpentyl isobutyrate produced the highest viscosity and contributed more to the thixotropy of the polyvinyl acetate paints than ethyl glycol monobutyl ether acetate and diethylene glycol monoethyl ether.

and is an anionic dispersing agent. Tamol is a registered trademark of Rohm & Haas Company.

Emulphor EL–719 is a non-ionic, water-soluble polyethylene ether of fatty acid. It is useful as an emulsion stabilizer for polyvinyl acetate emulsion paints. Emulphor is a registered trademark of General Aniline & Film Corporation.

Dowicide A is the tetra-hydrate of sodium o-phenylphenate. It is useful as a preservative and a fungicide, for example.

It is to be clearly understood that the invention is not limited to the specific illustrations given. 3-hydroxy-2,2,4-trimethylpentyl isobutyrate can be used in other aqueous polyvinyl acetate and aqueous acrylic emulsions than those specifically disclosed. To illustrate, other aqueous polyvinyl acetate and aqueous acrylic paints are known to those skilled in the art to which this invention is directed, and 3-hydroxy-2,2,4-trimethylpentyl isobutyrate can be incorporated therein as the solvent.

The results obtained by us show that 3-hydroxy-2,2,4-trimethylpentyl isobutyrate is a useful solvent in connec- TABLE 8.—VISCOSITY STABILITY OF POLYVINYL ACETATE PAINTS
[Brabender Viscosimeter: 50 r.p.m.; Pin Type Paddle; Heavy Spring Assembly]

| Pigment | Solvent | Initial | | 7 Days | | 14 Days | | 21 Days | | 28 Days | |
|---|---|---|---|---|---|---|---|---|---|---|---|
| | | Initial [a] | Basic [b] | Initial | Basic | Initial | Basic | Initial | Basic | Initial | Basic |
| Multisperse Blue R 11–951. | None | 540 | 60 | 740 | 200 | 510 | 130 | 440 | 100 | 480 | 120 |
| | 3-hydroxy-2,2,4-trimethylpentyl isobutyrate. | 620 | 90 | 1,000 | 280 | 680 | 160 | 640 | 150 | 640 | 180 |
| | Ethylene glycol monobutyl ether acetate. | 300 | 60 | 560 | 210 | 440 | 130 | 440 | 110 | 440 | 130 |
| | Diethylene glycol monoethyl ether | 140 | 40 | 480 | 160 | 370 | 100 | 340 | 70 | 450 | 90 |
| Multisperse Yellow 10G 12–953. | None | 360 | 40 | 500 | 110 | 320 | 90 | 300 | 60 | 460 | 90 |
| | 3-hydroxy-2,2,4-trimethylpentyl isobutyrate. | 620 | 60 | 580 | 160 | 460 | 120 | 460 | 110 | 500 | 140 |
| | Ethylene glycol monobutyl ether acetate. | 540 | 60 | 530 | 190 | 450 | 120 | 340 | 100 | 580 | 140 |
| | Diethylene glycol monoethyl ether | 320 | 40 | 430 | 140 | 400 | 100 | 340 | 70 | 330 | 90 |

[a] Initial viscosity; difference between this value and basic viscosity value indicates the degree of thioxotropy.
[b] Viscosity after equilibrium was attained.

*Flow-out properties*

The ability of a paint to flow-out minimizes brush marks to give the final coating a more pleasing appearance. This property was evaluated by brushing each paint on plasterboards to determine the ease of application and flow-out properties. The results obtained are set forth in Table 9.

TABLE 9.—FLOW-OUT PROPERTIES OF LATEX PAINTS

| Paint Type | Solvent | Ease of Flow |
|---|---|---|
| Polyvinyl acetate | None | Fair–Good. |
| | 3-hydroxy-2,2,4-trimethylpentyl isobutyrate. | Excellent. |
| | Ethylene glycol monobutyl ether acetate. | Do. |
| | Diethylene glycol monoethyl ether. | Do. |
| Acrylic | None | Fair. |
| | 3-hydroxy-2,2,4-trimethylpentyl isobutyrate. | Good. |
| | Ethylene glycol monobutyl ether acetate. | Do. |
| | Diethylene glycol monoethyl ether. | Do. |

It is here noted that wherever 3-hydroxy-2,2,4-trimethylpentyl isobutyrate is specified in the tabulations given herein, Texanol, a commercially sold brand of 3-hydroxy-2,2,4-trimethylpentyl isobutyrate, was employed.

Polyglycol P–1200 is a hydroxy terminated polypropylene glycol having a molecular weight of 1200.

Tamol 731 (25%) is described, for example, in the 1959 Technical Manual of the American Association of Textile Chemists and Colorists at page 563 as the "Sodium salt of a carboxylated polyelectrolyte in liquid form"

tion with aqueous latex film forming compositions wherein the latex material is compatible therewith. It can be used, for example, in aqueous polyinvyl acetate and aqueous acrylic film forming compositions. It is especially useful in aqueous polyvinyl acetate film forming compositions.

The discovery that 3-hydroxy-2,2,4-trimethylpentyl isobutyrate is a useful coalescing agent for certain aqueous latex film forming compositions is an important one economically because it is cheaper in price than the coalescing agents (i.e. ethylene glycol monobutyl ether acetate and diethylene glycol monoethyl ether) in current use and, in many instances, can be substituted therefor. As shown hereinbefore, 3-hydroxy-2,2,4-trimethylpentyl isobutyrate equals or excels ethylene glycol monobutyl ether acetate and diethylene glycol monoethyl ether as a coalescing agent for an aqueous polyvinyl acetate film forming composition (see Tables 1, 2 and 3). Similarly, 3-hydroxy-2,2,4-trimethylpentyl isobutyrate excels ethylene glycol monobutyl ether acetate as a coalescing agent for an aqueous acrylic film forming composition in the freeze-thaw stability test while both gave the same results in the minimum film forming temperature test. In an acrylic film forming composition 3-hydroxy-2,2,4-trimethylpentyl isobutyrate was superior to diethylene glycol monoethyl ether in the minimum film forming temperature test and inferior thereto in the freeze-thaw test.

Among the acrylic polymers which can be present in the aqueous acrylic film forming compositions are those prepared by polymerizing an alkyl methacrylate such as methyl-, ethyl-, propyl-, butyl-, isobutyl- and 2-ethylhexyl-methacrylate, for example, with an alkyl acrylate such as methyl-, ethyl-, propyl-, butyl- and 2-ethylhexyl-acrylate.

More than one alkyl methacrylate compound can be present in the polymerization reaction. Similarly, more than one alkyl acrylate compound can be present in the polymerization reaction.

The aqueous polyvinyl acetate emulsion containing 3-hydroxy-2,2,4-trimethylpentyl isobutyrate whose tack time is set forth in Table 3 possesses utility as an adhesive. As noted hereinbefore, the aqueous polyvinyl acetate adhesive compositions contain about 1% to about 10%, and preferably about 2% to about 4%, by weight of 3-hydroxy-2,2,4-trimethylpentyl isobutyrate based upon the total weight of the adhesive composition.

Although the invention has been described in considerable detail with reference to certain preferred embodiments thereof, it will be understood that variations and modifications can be effected without departing from the spirit and scope of the invention as described hereinbefore and as defined in the appended claims.

We claim:

1. An aqueous film-forming composition comprising polyvinyl acetate or a copolymer of alkyl methacrylate with alkyl acrylate, said composition containing as a coalescing agent a compatible amount of 3-hydroxy-2,2,4-trimethylpentyl isobutyrate.

2. A composition of claim 1 wherein the compatible amount of 3-hydroxy-2,2,4-trimethylpentyl isobutyrate is from about 1% to about 10% by weight based on the total weight of the composition.

3. A composition of claim 1 wherein the compatible amount of 3-hydroxy-2,2,4-trimethylpentyl isobutyrate is from about 2% to about 4% by weight based on the total weight of the composition.

4. In the preparation of aqueous latex paints the improvement which comprises incorporating 3-hydroxy-2,2,4-trimethylpentyl isobutyrate as a coalescing agent into a film-forming composition comprising polyvinyl acetate or a copolymer of alkyl methacrylate with alkyl acrylate, said composition being compatible with 3-hydroxy-2,2,4-trimethylpentyl isobutyrate.

5. An improvement of claim 4 wherein the amount of 3-hydroxy-2,2,4-trimethylpentyl isobutyrate incorporated as a coalescing agent into the film-forming composition is about 1% to about 10% by weight based upon the total weight of the film-forming composition.

6. An improvement of claim 4 wherein the amount of 3-hydroxy-2,2,4-trimethylpentyl isobutyrate incorporated as a coalescing agent into the aqueous film-forming composition is from about 2% to about 4% by weight based upon the total weight of the film-forming composition.

References Cited by the Examiner

UNITED STATES PATENTS

| | | | |
|---|---|---|---|
| 2,914,495 | 11/1959 | Gordon et al. | 260—29.6 |
| 3,032,521 | 5/1962 | Sanderson | 260—29.6 |
| 3,091,632 | 5/1963 | Hagemeyer et al. | 260—476 |

SAMUEL H. BLECH, *Primary Examiner.*

MURRAY TILLMAN, *Examiner.*

J. ZIEGLER, *Assistant Examiner.*